(12) United States Patent
Rojas

(10) Patent No.: US 12,542,675 B2
(45) Date of Patent: *Feb. 3, 2026

(54) SYSTEMS AND METHODS FOR ENCRYPTED MULTIFACTOR AUTHENTICATION USING IMAGING DEVICES AND IMAGE ENHANCEMENT

(71) Applicant: AXS Group LLC, Los Angeles, CA (US)

(72) Inventor: Michael J. Rojas, North Canton, OH (US)

(73) Assignee: AXS Group LLC, Los Angeles, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/510,462

(22) Filed: Nov. 15, 2023

(65) Prior Publication Data

US 2025/0047491 A1 Feb. 6, 2025

Related U.S. Application Data

(63) Continuation of application No. 17/643,158, filed on Dec. 7, 2021, now Pat. No. 11,863,682.

(51) Int. Cl.
*H04L 9/00* (2022.01)
*G06F 16/27* (2019.01)
(Continued)

(52) U.S. Cl.
CPC ............ *H04L 9/3226* (2013.01); *G06F 16/27* (2019.01); *G06N 3/042* (2023.01); *H04L 9/3297* (2013.01); *H04L 9/3236* (2013.01); *H04L 9/50* (2022.05)

(58) Field of Classification Search
CPC ... H04L 9/3226; H04L 9/3297; H04L 9/3236; H04L 9/50; H04L 9/0618; H04L 9/12;
(Continued)

(56) References Cited

U.S. PATENT DOCUMENTS 3,622,995 A 11/1971 Dikes et al.
5,999,095 A 12/1999 Earl et al.
(Continued)

FOREIGN PATENT DOCUMENTS

CN 101025806 A 8/2007
CN 101299286 A 11/2008
(Continued)

OTHER PUBLICATIONS

Tripathi, A. "Algorithms for Validating E-Tickets in Mobile Computing Environment," Dec. 20, 2007, (Year: 2007).
(Continued)

*Primary Examiner* — Kevin Ayala
(74) *Attorney, Agent, or Firm* — Knobbe, Martens, Olson & Bear LLP

(57) ABSTRACT

An authentication code may be encrypted in optical indica. Optionally, AES, RSA, DES, and/or a hashing function may be utilized to encrypt the authentication code. An image of the authentication code may be captured from a device having a display using a digital camera. The image may be in a compressed format and transmitted over a network to an image analysis system. The image analysis system may decode the optical indicia to obtain the encoded authentication data and may perform decryption on the decoded data. If needed, the image analysis system may perform image enhancement prior to performing decoding, including contrast enhancement, deblurring, and/or image rotation. Image enhancement may be performed using a neural network. The authentication data and location data associated with the digital camera may be utilized to authenticate the device.

23 Claims, 6 Drawing Sheets

(51) Int. Cl.
*G06N 3/042* (2023.01)
*H04L 9/32* (2006.01)

(58) Field of Classification Search
CPC ..... H04L 2209/56; G06F 16/27; G06F 21/36; G06F 21/64; G06N 3/042; G06N 3/0455; G06N 3/0464
See application file for complete search history.

(56) References Cited

U.S. PATENT DOCUMENTS

| | | | |
|---|---|---|---|
| 6,496,809 B1 | 12/2002 | Nakfoor | |
| 6,685,093 B2 | 2/2004 | Challa et al. | |
| 6,842,741 B1 | 1/2005 | Fujimura | |
| 6,854,651 B2 | 2/2005 | Smith et al. | |
| 7,146,645 B1 | 12/2006 | Hellsten | |
| 7,454,361 B1 | 11/2008 | Halavais | |
| 7,693,744 B2 | 4/2010 | Forbes | |
| 8,346,580 B2 | 1/2013 | Nakfoor | |
| 8,624,725 B1 | 1/2014 | MacGregor | |
| 8,676,615 B2 * | 3/2014 | Callaghan | G06Q 30/0643 348/222.1 |
| 8,775,807 B1 | 7/2014 | Vazquez | |
| 9,070,231 B1 | 6/2015 | Meyers | |
| 9,147,191 B2 | 9/2015 | Cohen et al. | |
| 9,153,082 B2 | 10/2015 | Martinez | |
| 9,197,313 B2 | 11/2015 | Delpuch | |
| 9,600,946 B1 | 3/2017 | Gerace et al. | |
| 9,697,650 B2 | 7/2017 | Nakfoor | |
| 9,876,788 B1 | 1/2018 | Ziraknejad | |
| 9,898,880 B2 | 2/2018 | Nagisetty | |
| 10,109,125 B1 | 10/2018 | Gerace et al. | |
| 10,163,105 B1 | 12/2018 | Ziraknejad | |
| 10,460,538 B1 | 10/2019 | Gerace et al. | |
| 10,643,209 B2 | 5/2020 | Cohen et al. | |
| 10,867,460 B1 | 12/2020 | Miller | |
| 10,878,648 B1 | 12/2020 | Gerace et al. | |
| 10,891,562 B1 | 1/2021 | Gerace et al. | |
| 11,200,306 B1 | 12/2021 | Singh | |
| 11,350,024 B1 | 5/2022 | Stallman | |
| 11,611,552 B2 | 3/2023 | Backlund | |
| 2001/0051915 A1 | 12/2001 | Ueno et al. | |
| 2002/0169876 A1 | 11/2002 | Curie | |
| 2003/0047613 A1 | 3/2003 | Funamoto et al. | |
| 2003/0105964 A1 | 6/2003 | Brainard | |
| 2003/0110239 A1 | 6/2003 | Sugumoto | |
| 2003/0164400 A1 | 9/2003 | Boyd | |
| 2003/0171960 A1 | 9/2003 | Skinner | |
| 2003/0182242 A1 | 9/2003 | Scott et al. | |
| 2004/0006497 A1 | 1/2004 | Nestor et al. | |
| 2004/0035925 A1 | 2/2004 | Wu et al. | |
| 2005/0021364 A1 | 1/2005 | Nakfoor | |
| 2005/0105734 A1 | 5/2005 | Buer | |
| 2006/0089919 A1 | 4/2006 | Kidd | |
| 2006/0101507 A1 | 5/2006 | Camenisch | |
| 2007/0226055 A1 | 9/2007 | Belanger | |
| 2008/0015983 A1 | 1/2008 | Spikes | |
| 2009/0183247 A1 | 7/2009 | Kasper et al. | |
| 2009/0188983 A1 | 7/2009 | Walker | |
| 2009/0198617 A1 | 8/2009 | Soghoian | |
| 2009/0294539 A1 | 12/2009 | Kim | |
| 2009/0328207 A1 | 12/2009 | Patel | |
| 2010/0023553 A1 | 1/2010 | Gausman | |
| 2010/0082491 A1 | 4/2010 | Rosenblatt | |
| 2010/0198626 A1 | 8/2010 | Cho et al. | |
| 2011/0105154 A1 | 5/2011 | Kim | |
| 2011/0117966 A1 | 5/2011 | Coppinger | |
| 2011/0251862 A1 | 10/2011 | Deluca | |
| 2011/0281652 A1 | 11/2011 | Laverdiere | |
| 2011/0282725 A1 | 11/2011 | Chatterjee | |
| 2012/0091202 A1 | 4/2012 | Cohen et al. | |
| 2012/0185695 A1 | 7/2012 | Shah | |
| 2012/0197797 A1 | 8/2012 | Grigg | |
| 2012/0214515 A1 | 8/2012 | Davis et al. | |
| 2012/0323691 A1 | 12/2012 | McLaughlin | |
| 2013/0085834 A1 | 4/2013 | Witherspoon, Jr | |
| 2013/0090939 A1 | 4/2013 | Robinson | |
| 2013/0185816 A1 | 7/2013 | Maeda | |
| 2013/0262163 A1 | 10/2013 | Bergdale et al. | |
| 2013/0304521 A1 | 11/2013 | Aird | |
| 2013/0325523 A1 | 12/2013 | Huang | |
| 2014/0039945 A1 | 2/2014 | Coady | |
| 2014/0049373 A1 | 2/2014 | Troy | |
| 2014/0100896 A1 | 4/2014 | Du | |
| 2014/0164029 A1 | 6/2014 | Kwak | |
| 2014/0172707 A1 | 6/2014 | Kuntagod | |
| 2014/0222531 A1* | 8/2014 | Jacobs | H04W 4/029 709/204 |
| 2014/0240350 A1 | 8/2014 | Chen et al. | |
| 2014/0240469 A1 | 8/2014 | Lee | |
| 2014/0258530 A1 | 9/2014 | Potterat | |
| 2015/0142483 A1 | 5/2015 | Bergdale | |
| 2015/0172920 A1 | 6/2015 | Ben Ayed | |
| 2015/0294515 A1 | 10/2015 | Bergdale | |
| 2015/0295711 A1 | 10/2015 | Javidi et al. | |
| 2015/0317466 A1 | 11/2015 | Kumar | |
| 2017/0329777 A1 | 11/2017 | Vlugt | |
| 2017/0358148 A1 | 12/2017 | Kayhani | |
| 2018/0158000 A1 | 6/2018 | Fredette | |
| 2018/0261029 A1 | 9/2018 | Johnson et al. | |
| 2019/0267036 A1* | 8/2019 | Albertson | G06F 21/64 |
| 2020/0090143 A1 | 3/2020 | Iervolino | |
| 2020/0127834 A1 | 4/2020 | Westland et al. | |
| 2020/0143022 A1 | 5/2020 | Frost | |
| 2020/0209917 A1 | 7/2020 | Zhou | |
| 2020/0236106 A1 | 7/2020 | Ahuja et al. | |
| 2020/0294173 A1 | 9/2020 | Shah | |
| 2020/0296091 A1 | 9/2020 | Lidsky | |
| 2020/0320576 A1 | 10/2020 | Harrison | |
| 2020/0322154 A1 | 10/2020 | Konda et al. | |
| 2020/0380229 A1 | 12/2020 | Peruch | |
| 2021/0090082 A1* | 3/2021 | Cohen | G07C 9/27 |
| 2021/0150626 A1 | 5/2021 | Robotham | |
| 2021/0174373 A1* | 6/2021 | Nakagawa | G06Q 30/018 |
| 2021/0216893 A1 | 7/2021 | Roden | |
| 2021/0326845 A1 | 10/2021 | Yantis et al. | |
| 2021/0357489 A1 | 11/2021 | Tali et al. | |
| 2021/0357893 A1* | 11/2021 | Kang | G06Q 20/1235 |
| 2022/0014526 A1 | 1/2022 | Burgess | |
| 2022/0079439 A1 | 3/2022 | Heislop | |

FOREIGN PATENT DOCUMENTS

| | | |
|---|---|---|
| CN | 103415858 B | 3/2018 |
| DE | 100 34 275 A1 | 1/2002 |
| EP | 3 293 995 A1 | 3/2018 |
| JP | 2001-256513 A | 9/2001 |
| JP | 2001-319186 A | 11/2001 |
| JP | 2002-109343 A | 4/2002 |
| JP | 2002-123730 A | 4/2002 |
| JP | 2002-344444 A | 11/2002 |
| JP | 2004-295650 A | 10/2004 |
| KR | 10-2003-0022630 A | 3/2003 |
| KR | 10-2004-0021165 A | 3/2004 |
| KR | 10-0592411 B1 | 6/2006 |
| WO | WO 94/10658 | 5/1994 |
| WO | WO 2012/096749 A2 | 7/2012 |
| WO | WO 2021/214134 A1 | 10/2021 |

OTHER PUBLICATIONS

"Haitao Pu, Quick response barcode deblurring via doubly convolution neural network, Mar. 10, 2018, Multimedia Tools Applications 78, pp. 897-912" (Year: 2018).

Balaban, D. "German football charges forward with e-ticketing." Card Technology, 10(10), 18-22. Retrieved from https://dialog.proquest.com/professional/docview/198546689?accountid=131444 (Year: 2005).

Canadian Preliminary Review regarding Canadian Application No. 2577118, dated Jan. 25, 2019, 12 pages.

European Office Action, from EP Application No. 11855858.4, dated Oct. 4, 2019.

(56) References Cited

OTHER PUBLICATIONS

Haberl et al., "CDeep3M-Preview: Online Segmentation Using The Deep Neural Network model Zoo," this version posted Mar. 26, 2020, pp. 1-6, 9; [retrieved on Mar. 15, 2023]. Retrieved from https://www.biorxiv.org/content/10.1101/2020.03.26.010660v1.abstract.

International Preliminary Report on Patentability and Written Opinion of the International Searching Authority for PCT/US2011/064807, "Mobile Application Bar Code Identification and System", dated Jul. 25, 2013.

International Search Report and Written Opinion dated Mar. 24, 2023, received in International Patent Application No. PCT/US2022/080273, in 14 pages.

Karaiskos et al., "User Acceptance of Pervasive Information Systems: Evaluating an RFID Ticketing System", ECIS 2007 Proceedings. 4, retrieved from https://aisel.aisnet.org/cgi/viewcontent.cgi?article=1192&context=ecis2007 (Year: 2007).

Notification of Transmittal of The International Search Report and The Written Opinion of the International Searching Authority, or the Declaration for International Application No. PCT/US2011/064807, date of mailing Jul. 24, 2012, 9 pages.

Srdan Barzut, "A Novel Fingerprint Biometric Cryptosystem Based on Convolutional Neural Networks," In: MDPI, Mathematics 2021, 9)7), 730, Mar. 28, 2021, Doi: 10.3390/math9070730; https://www.researchgate.net/publication/350456509.

Supplementary European Search Report for EP Application No. 11855858.4; dated Mar. 29, 2017; Flash Seats, LLC; 9 pages.

Extended European Search Report dated Jul. 14, 2025, regarding EP Patent No. 22905237.8, 15 pages.

\* cited by examiner

SYSTEMS AND METHODS FOR ENCRYPTED MULTIFACTOR AUTHENTICATION USING IMAGING DEVICES AND IMAGE ENHANCEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to systems and methods for multifactor authentication, optionally including the use of a camera, and the decryption of optical, computer readable indicia.

Description of the Related Art

Electronic data transfers and storage have become ever more critical. Often important and valuable information is electronically transferred over networks and stored in one or more data stores. Such information has become an attractive target for hackers. Hackers may utilize multiple techniques in attempts to obtain user passwords so as to access user accounts and user information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to methods and systems for performing multifactor authentication. An authentication code may be encrypted in optical indicia (e.g., encrypted utilizing Advanced Encryption Standard (AES), Rivest-Shamir-Adleman (RSA), DES (Data Encryption Standard), and/or a hashing function). An image of the authentication code may be captured from a device having a display using a digital camera. The image may be in a compressed format and transmitted over a network to an image analysis system. The image analysis system may decode the optical indicia to obtain the encoded authentication data and may perform decryption on the decoded data. The image analysis system optionally performs image enhancement prior to performing decoding, including contrast enhancement, deblurring, and/or image rotation. Image enhancement may be performed using a neural network comprising an input layer an output layer and one or more hidden layers. The authentication data and location data associated with the digital camera may be utilized to authenticate the device.

An aspect of the present application relates to an authentication code that may be encrypted and encoded in optical indicia. An image of the authentication code may be captured using a digital camera or other image capture device, such as a laser scanner) from a device having a display. The image may be in a compressed format and transmitted over a network to an image analysis system. The image may be decompressed. The image analysis system may optionally enhance the image. For example, the image analysis system may optionally perform, using a deep neural network comprising an input layer, and output layer, and hidden layers, edge detection and enhance contrast about the detected edges (e.g., using a filter). By way of further example, the image analysis system may optionally perform deblurring on the image. By way of yet further example, the image analysis system may optionally perform image rotation to align the optical indicia with a reference axis. The image analysis system may decode the optical indicia to obtain the encoded authentication data and may perform decryption on the decoded data. If needed, the image analysis system optionally performs image enhancement prior to performing decoding. The authentication data and location data associated with the digital camera may be utilized to the authenticate device.

An aspect of the present disclosure relates to a multifactor authentication system configured to utilize encrypted authentication data, comprising: a network interface; at least one processing device operable to: receive at a first time, via the network interface, a compressed image from an imager at a first location of a venue, wherein the compressed image comprises an image of an optical code displayed by a device; receive, via the network interface, an identifier associated with the imager; decompress the compressed image; perform, using a deep neural network: image enhancement on the decompressed image to generate an enhanced image, the image enhancement comprising at least one of: edge enhancement; deblurring, or rotation; decode the optical code in the enhanced image; determine whether: the decoded code includes authentication data that corresponds to a record stored in a data store that indicates an access right to enter the venue at the first time, and whether the access right to enter the venue at the first time comprises a right to access the venue via the first location; at least partly in response to determining that the authentication data corresponds to a record stored in a data store that indicates an access right to enter the venue at the first time, and that the access right to enter the venue at the first time comprises a right to access the venue via the first location: transmit a command to an authentication verification interface to indicate a successful authentication verification, and record on a distributed synchronized database a transfer of a first electronic element to a first user. The first electronic element may represent a limited edition image.

An aspect of the presented disclosure relates to a computerized method, the method comprising: receiving, at a computer system, encrypted authentication data from a device of a first user from a scanner at a venue; using the encrypted authentication data to determine whether a corresponding user record exists, comprising at least two items of authentication credentials, indicating that the first user has an access right to access an event at the venue; at least partly in response to determining, using the encrypted authentication data, that a corresponding user record exists indicating that the first user has an access right to access an event at the venue, transmitting an instruction to an authentication verification interface to indicate a successful authentication verification; detecting a first occurrence during the event, the first occurrence related to an event performance; at least partly in response to detecting the first occurrence during the event, the first occurrence related to an event performance, selecting a first electronic element; causing the selected first electronic element to be transferred to the first user and recording the transfer of the first electronic element to the first user on a distributed synchronized database. The first electronic element may represent a limited edition image.

An aspect of the presented disclosure relates to a computerized method, the method comprising: receiving, at a computer system, encrypted authentication data from a device of a first user from a scanner at a venue; using the encrypted authentication data to determine whether a corresponding user record exists, comprising at least two items of authentication credentials, indicating that the first user has an access right to access an event at the venue and at least partly in response to determining, using the encrypted authentication data, that a corresponding user record exists indicating that the first user has an access right to access an event at the venue, transmitting an instruction to an authentication verification interface to indicate a successful authentication verification and/or detecting a first occurrence during the event, the first occurrence related to an event performance and at least partly in response to detecting the first occurrence during the event, the first occurrence related to an event performance, selecting a first electronic element; causing the selected first electronic element to be transferred to the first user and recording the transfer of the first electronic element to the first user on a distributed synchronized database.

An aspect of the present disclosure relates to non-transitory computer readable memory that stores instructions, that when executed by a computer system comprising one or more computing devices, cause the computer system to perform operations comprising: receiving authentication data from a device of a first user from a scanner at a venue; using the authentication data to determine whether a corresponding user record exists indicating that the first user has an access right to access an event at the venue; at least partly in response to determining, using the authentication data, that a corresponding user record exists indicating that the first user has an access right to access an event at the venue, transmitting an instruction to an authentication verification interface to indicate a successful authentication verification; at least partly in response to detecting a first occurrence during the event, the first occurrence related to an event performance and/or in response to determining, using the authentication data, that a corresponding user record exists indicating that the first user has an access right to access an event at the venue, selecting a first electronic element; and causing the selected first electronic element to be transferred to the first user and recording the transfer of the first electronic element to the first user on a distributed synchronized database. The first electronic element may represent a limited edition image.

An aspect of the present disclosure relates to non-transitory computer readable memory that stores instructions, that when executed by a computer system comprising one or more computing devices, cause the computer system to perform operations comprising: receiving authentication data from a device of a first user from a scanner at a venue; using the authentication data to determine whether a corresponding user record exists indicating that the first user has an access right to access an event at the venue and at least partly in response to determining, using the authentication data, that a corresponding user record exists indicating that the first user has an access right to access an event at the venue, transmitting an instruction to an authentication verification interface to indicate a successful authentication verification and/or at least partly in response to detecting a first occurrence during the event, the first occurrence related to an event performance and/or in response to determining, using the authentication data, that a corresponding user record exists indicating that the first user has an access right to access an event at the venue, selecting a first electronic element; and causing the selected first electronic element to be transferred to the first user and recording the transfer of the first electronic element to the first user on a distributed synchronized database.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
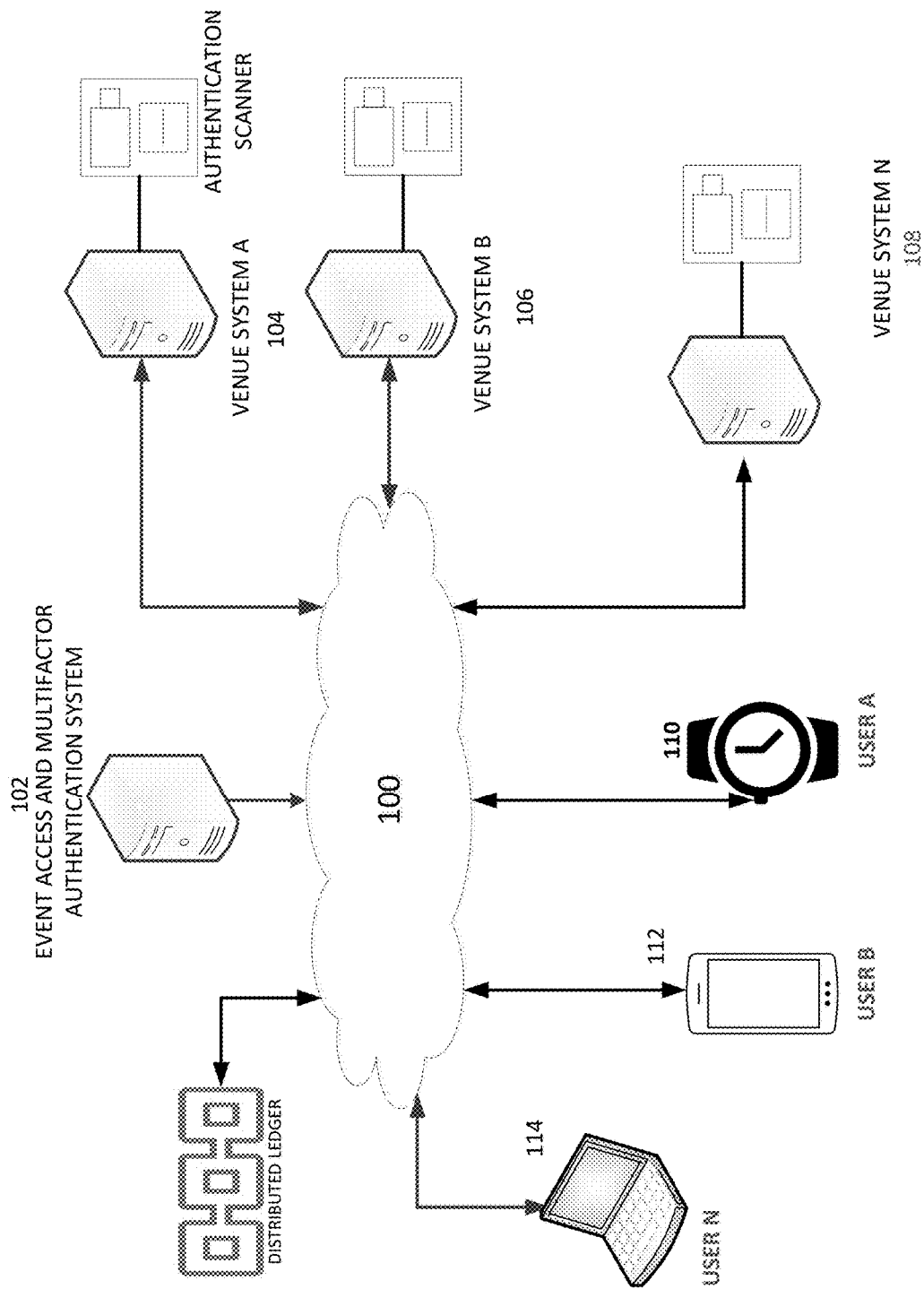
FIG. 1A illustrates an example networked environment architecture.

An aspect of the present disclosure relates to methods and systems for performing multifactor authentication using optical indicia and image processing. An authentication code may be encrypted in optical indicia. An image of the authentication code may be captured from a device having a display using a digital camera. The image may be in a compressed format and transmitted over a network to an image analysis system. The image analysis system may decode the optical indicia to obtain the encoded authentication data and may perform decryption on the decoded data. The image analysis system optionally performs image enhancement prior to performing decoding, including contrast enhancement, deblurring, and/or image rotation. Image enhancement may be performed using a neural network comprising an input layer an output layer and one or more hidden layers. The authentication data and location data associated with the digital camera may be utilized to authenticate the device.

An aspect of the present disclosure relates to systems and methods for securely and efficiently distributing and exchanging content. For example, multifactor authentication comprising multi-credential and geographical location verification may be used to ensure that certain electronic assets (sometimes referred to as elements) are transmitted to the correct user at the correct location at the correct time and that users may access certain physical locations. Another aspect of the present disclosure relates to the authentication of certain rights to electronic content. Another aspect of the present disclosure relates to the tracking of transfers of content.

Multifactor authentication enhances security as two or more credentials of different types are needed to access a resource (e.g., admission to a site, such as an event venue). As will be described, optionally the credentials may include a unique user identifier and a unique user device identifier, which may need to be presented at a specific geographical location (e.g., a venue or a specific set of venue entryways, such as entryways to seating areas).

As described herein, a user may acquire event access rights for one or more attendees. Optionally, rather than providing a user with a physical or a downloaded ticket stored on a user device, a user right to access a site (e.g., an event venue) may be performed using multifactor authentication, where the user device does not need to be connected to a network when the multifactor authentication is performed. For example, a user right to access a venue (or a portion of thereof) for an event may optionally be performed by authenticating a user device and a user at a specific location (e.g., an event venue or a subset of venue/seating area entrances). By way of example, the user device may be smart phone, a wearable computing device (e.g., a smart watch, a smart badge, smart glasses, smart clothing, smart jewelry, etc.), a tablet computer, or other portable computing device.

For example, an application configured to enable a user to access events at venues may be downloaded from an application store (sometimes referred to as an app store) or other source and installed on the user device. As will be discussed, optionally the same application may be used to manage electronic tokens. For example, the application may include access to a wallet (sometimes referred to herein as a logical storage module) configured to store fungible tokens (sometimes referred to herein as non-unique digital elements of NDEs) and nonfungible tokens (sometimes referred to herein as unique digital elements or UDEs). The user may register an account with an event access and multifactor authentication system configured to manage and control event access. The user account may include authentication credentials, such as a unique identifier associated with the user and/or a unique identifier associated with the user device. The unique identifier associated with the user device may optionally be an identifier other than or in addition to a phone number associated with the user device to thereby make it more difficult to mimic. The unique user device identifier, optionally used in performing multifactor authentication, may or may not be assigned to the user device by the event access and multifactor authentication system.

For example, the user device identifier may include one or more of an International Mobile Equipment Identity (IMEI) 14 digit number, a Unique Device ID (UDID) comprising a 40-digit sequence of letters and numbers, a serial number, an ID for Advertisers (IDFA), or a Google Advertiser ID (GAID). Optionally, the event access and multifactor authentication system may embed a unique identifier in the application downloaded to the user device which may then be used as the unique device identifier.

The unique user identifier (optionally used in multifactor authentication) may or may not be assigned to the user by the event access and multifactor authentication system. For example, the user may provide a user identifier, and the system may search its database of user identifiers. If the system detects that the user identifier is associated with another user or user account, the user may be instructed by the system to select a different user identifier. This process may repeat until the user specifies what is determined to be a unique user identifier. Optionally, in addition or instead, the system may generate a unique user identifier and may transmit the assigned unique user identifier to the user device. The application hosted on the user device may access the unique device identifier and use it during the authentication/verification processes described herein.

Optionally, the application hosted on the user device and may or may not present the unique user device identifier and/or user identifier to the user in human readable form (using alphanumeric or ASCII characters). Thus, the user may be unaware of the actual values of the user device identifier and/or user identifier.

When the user arrives at a venue entrance (which may be an initial entrance to a venue building or area, or may be an interior entrance to a specific seating or other area within the venue, such as a VIP area), the user device may present the unique user device identifier and/or user identifier to a venue scanner, optionally encoded (e.g., encrypted and converted from the digital realm to an optical, radiofrequency, and/or audio representation). For example, the user device may (e.g., via the application hosted on the user device) present the unique user device identifier and/or user identifier, as well as a timestamp of the current time, encoded in a visual indicia (e.g., a barcode, such as a QR code or linear barcode), encoded in an electronic signal (e.g., via Bluetooth, Wifi, NFC, or the like), and/or encoded in an audio signal. The timestamp will prevent a user from taking a screenshot or other recording of the presented data, forwarding the screenshot or other recording to another user device so that the other user may attempt to use the screenshot or other recording to gain access to the event, as the timestamp in the screenshot or other recording will likely no longer reflect the current time.

The user device application may periodically (e.g., every 5, 10, 15, or 30 seconds) refresh the presented data to update the timestamp to about the current time. The unique user device identifier and/or user identifier, (and optionally the timestamp) may be encrypted using a hash code, using symmetric encryption, using asymmetric encryption, or otherwise.

For example, Advanced Encryption Standard (AES), a symmetric encryption algorithm that encrypts fixed blocks of data (of 128 bits) at a time, may be used. AES utilizes a substitution-permutation network and may have a fixed block size (e.g., 128 bits), and a key size of 128, 192, or 256 bits.

By way of further example, Rivest-Shamir-Adleman (RSA) encryption/decryption techniques may be utilized. RSA is a public-key cryptosystem, where the encryption key is public and where a decryption key is kept private. An RSA user may create and publishes a public key (based on large prime numbers and an auxiliary value, where the primate numbers are kept private/secret). Data can be encrypted by anyone, via the public key, but can only be decoded by someone who knows the private key (the prime numbers). By way of yet further example, triple DES (Data Encryption Standard) encryption/decryption techniques may be utilized (optionally in conjunction with AES). Triple Data Encryption Standard (DES) applies block cipher algorithms three times to each data block. Each block contains 64 bits of data. Three keys are referred to as bundle keys with 56 bits per key. In certain forms of DES, all keys may be independent, two of the three keys may be independent, or all three keys may be identical (triple DES). The triple DES key length contains 168 bits and the key security may be 112 bits. By way of yet further example, a hash function may be utilized. Hashing changes a plain text or a key to a hashed value by applying a hash function. Optionally, the input length is greater in size than the output hash value. Hashing provides a one-way encryption process such that a hash value cannot be reverse engineered to get to the original plain text or key.

Thus, the venue scanner may be equipped with a camera, a laser scanner, a radio frequency receiver, a microphone device, and/or other device for receiving the unique user device identifier and/or user identifier.

A timestamp may also be generated by the venue scanner and/or event access and multifactor authentication system (or other system) corresponding to when the unique user device identifier and/or user identifier, and timestamp were received by the venue scanner and/or event access and multifactor authentication system. The venue scanner may directly or via the event access and multifactor authentication system (or other system) decrypt the encrypted unique user device user identifier, and/or timestamp, and may compare the timestamp received from the user device with that generated by the venue scanner and/or system. If the timestamps fail to match (e.g., exactly match or match within a certain range of time, such as 1-15 seconds), the venue scanner or system may indicate an authentication failure.

If the timestamps are determined to match, the venue scanner may directly or via the event access and multifactor authentication system compare the unique user device and/or user identifier (or a hash thereof) to those in a user database. If the unique user device and/or user identifier (or a hash thereof) match those of a user account, a determination may be made as to whether the user account is associated with one or more access rights to the event. Where a hash is used, the hash may be, by way of example, a MD5, SHA-1, SHA-256, or other hash. If the user device and/or user identifier are encrypted using a public key associated with the system (where asymmetric encryption is employed), a private key may be used to decrypt the user device and/or user identifier. If the user device and/or user identifier are encrypted using symmetric encryption, the key used to perform the encryption may be used to perform the decryption.

If a determination is made that the user account is associated with one or more access rights to the event, a corresponding authentication/verification indication may be provided via a device at the venue entrance (e.g., a display device, a sound generating device, a gate that opens, and/or the like) and the user may access the event venue. For example, the authentication/verification success indication may comprise the illumination of a light of a certain color (e.g., green), text (e.g., "authentication approved"), a graphic (e.g., a thumbs-up symbol), and/or a sound (e.g., a bell sound). Optionally, the number of access rights that the user has is presented. For example, a user may have access rights for the user and certain user friends. Optionally, in response to a successful authentication/verification a solenoid, stepper motor, or other electro or electro-mechanical device may be activated to unlock/open a barrier to admit the user (and one or more other users) into a venue.

If a determination is made that the user account is not associated with one or more access rights to the event, a corresponding authentication/verification failure indication may be provided via a device at the venue entrance (e.g., a display device, a sound generating device, a gate that closes or remains closed, and/or the like). For example, the authentication/verification failure indication may comprise the illumination of a light of a certain color (e.g., red), text (e.g., "authentication failed"), a graphic (e.g., a prohibition symbol), and/or a sound (e.g., a boing sound).

Optionally, in order for a determination to be made that the user is to be authenticated/verified as having access rights to the event or to a given venue entrance, an identifier associated with the event venue scanner needs to be received (e.g., in association with the user identifier and the user device identifier) and verified. For example, a user's access rights stored by the system may indicate which venue entrances a user is entitled to pass through (and explicitly or inferentially indicate which venue entrances a user is not entitled to pass through). Thus, even if the user identifier, user device identifier, and timestamp are verified, if the user does not have access rights to the venue entrance as which the user device was scanned, optionally a corresponding notification may be provided to a venue operator and/or the user, and the user may be denied entrance. The notification may optionally indicate which venue entrances the user is entitled to access. This optionally ensures that a user will be provided access rights to certain seating areas of an event venue that the user is entitled to, and is not granted access to an entrance providing admissions to seating areas the user does not have access rights to.

Optionally, in addition to or instead of one or more of the foregoing authentication techniques (e.g., using a unique user identifier assigned to or provided by the user, a unique device identifier, and/or a venue authentication scanner identifier), biometric authentication may be provided. For example, a camera may be utilized to capture an image of a user device which may be used to authenticate a user. By way of further example, a fingerprint reader may be used to read a user's fingerprint for authentication purposes. By way of yet further example, an iris reader may be used to capture a user's iris for authentication purposes. The biometric readings of the user may be compared to stored user readings (which may be associated with a corresponding user identifier and device identifier), and if a match is not found, a verification failure indication may be provided as similarly discussed above.

Thus, a user can be authenticated, optionally using multifactor authentication, and the user right to access an event determined at a venue via a user device, where the user device does not have a ticket or the like downloaded to the user device, and even where the user device does not have Internet access at the venue. The multifactor authentication may, for example, include two or more of a unique user identifier, a unique user identifier, a timestamp, a biometric reading, or a geographical location of the user (e.g., where the unique user identifier, the unique user identifier, the biometric reading, and/or the timestamp need to be verified at a specific location, that is, an event venue).

Optionally, a user may be provided a unique non-fungible token (sometimes referred to herein as a unique digital element, or UDE or NFT) in conjunction with an event admission. A UDE may have an associated payload of content, where the payload may be configured to accept various types of content (tickets, artwork, video recordings, audio recordings, performer biographies, player scoring history, etc.). By way of further example, the UDE may represent content, such as a representation of an electronic ticket to an event (where optionally the representation of the electronic ticket is not used and/or useable to obtain access to the event venue). The electronic ticket may include a design similar to a conventional physical ticket where the design includes an event name, an event date and time, an event venue, a seating location, a promoter name, a barcode (e.g., a QR code, a 2-dimensional barcode), one or more images corresponding to an event performer (e.g., a musician, band, athlete, sports team, league, etc.) and/or a venue, one or more ads, and/or other data. Optionally, the UDE may be utilized to gain access to one or more areas within the venue (e.g., a VIP area, an eating area, etc.)

Optionally, the UDE may be transferred to the user in response to the user being admitted to the event. Thus, the user may be admitted to the event at least partly in response to scanning, at a venue, a device identifier and/or a user identifier as similarly discussed above (or using an e-ticket, sometimes referred to herein as an access token stored on the user device or a physical access token). Thus, the UDE may only be provided to the user after authentication (e.g., multifactor authentication) is performed (e.g., after a unique user identifier, a unique user identifier, a timestamp, a biometric reading, and/or a geographical location of the user are verified).

A user admission indication may be received and stored by the event access and multifactor authentication system. In response to the admission indication, the system may optionally, in real time, mint and/or transfer a UDE (and/or non-unique digital element) to the user. However, the minting of UDEs in real time may incur undesirable delays and/or unduly increase peak system and network loading, particularly for events with large numbers of attendees (e.g., over 15,000 attendees, over 50,000 attendees, over 100,000 attendees). Optionally, the UDEs to be distributed to event attendees are pre-minted prior to the event so that the minting workload can be distributed over time (e.g., as a given user is authenticated at the event venue or in response to certain events occurring) to reduce peak system and network loading, and to reduce delays in transferring the UDEs to attendees. If the user device has network access at the venue, the UDE may appear during the event in an electronic logical storage module accessible via the user device. If the user device does not have network access at the venue, the UDE may be accessed after the event in an electronic logical storage module accessible via the user device. The electronic logical storage module may be configured to store UDEs and cryptocurrency.

The UDE may represent a digital asset (sometimes referred to as a digital element), such as content which may optionally associated with the event. For example, the content may be a unique artwork, such as a graphic, a photograph, a sound recording, or other content. A UDE may be stored on a distributed database that is synchronized and accessible across different sites and geographies by multiple participants (e.g., a distributed digital ledger) that certifies a digital element to be unique and therefore not interchangeable. The use of a distributed digital ledger enables transactions and/or contracts to be maintained in decentralized form across different, geographically computers, so that a central authority is not needed to check against manipulation, or to authorize or validate transactions.

Optionally, data, such as the UDE, may be encrypted for transmissions and/or storage on the distributed ledger. Optionally, symmetric encryption may be utilized, where the same key is used for encrypted and decryption. Optionally, asymmetric encryption cryptography is utilized, where the sender encrypts the UDE (and/or other data) using the recipient's public key (which may be disseminated openly) but may only be decrypted using the recipient's private key (which may only be known by the recipient).

A distributed digital ledger can be and/or may support a blockchain network. The terms "distributed ledger-based network," "synchronized distributed database," and "blockchain network" may be used interchangeably in the present disclosure although a distributed ledger-based network or synchronized distributed database may take a form other than a blockchain. The disclosed distributed digital ledger may optionally be a private distributed digital ledger to enhance user privacy regarding data (such as data discussed herein). Optionally instead, the disclosed distributed digital ledger may optionally be a public distributed digital ledger to enhance to enhance compatibility with applications configured for public synchronized distributed database networks.

Optionally, to ensure data integrity, a one-way hash function may be utilized on the UDE and/or other data. The hash may be a mathematical function that converts an input of arbitrary length into an encrypted output of a fixed length (regardless of the original amount of data or file size). Advantageously, the output of the hash function cannot be used to derive the input to the hash function. However, if the same hash function is used on the same data, the hashes will be identical, enabling a validation to be performed that data is the same and unaltered if the data hash is known. For example, the hash may start with the data available in a block header (e.g., containing a version number, a timestamp, and a hash used in the previous block, the hash of the Merkle root, the nonce (a string of numbers), and the target hash). During mining, the nonce may be appended to the hashed contents of the previous block, which is then hashed to create a new hash. If this new hash is less than or equal to the target hash, then it is accepted as the solution, the miner is given the reward, and the block is added to the synchronized distributed database.

Each UDE may be stored with a unique identifying code (a digital signature) and ownership data. A UDE may create a tamper resistant or tamper proof digital contract, proof of ownership, proof of authenticity, proof of certification, and information about the digital content and business rules related to the digital content, that is coupled to the digital content.

A UDE representing content (e.g., an access token, images, graphics, and/or sound recordings associated with the event, and/or the like) may grant the receiving user with certain ownership rights in the content (although the creator or owner of the content may retain ownership of the copyright and reproduction rights in the content). Thus, a UDE may be used to tokenize one or more items of content, such as content disclosed herein. A given UDE may only have one official owner at a time and it may be secured by a blockchain or other distributed digital ledger/synchronized distributed database to prevent anyone from modifying the record of ownership or copy or paste a new UDE into existence. Optionally, the synchronized distributed database makes the ownership of the UDE of public record and easy for anyone to verify. Thus, a user can easily prove ownership of the UDE and others cannot manipulate the UDE.

A user may be enabled to "store" or record the UDE in a user synchronized distributed database logical storage module (e.g., a logical storage module that enables a user to store, manage, and trade UDEs and/or crypto currencies). Once the synchronized distributed database logical storage module is created, the user may be provided with a synchronized distributed database logical storage module unique identifier. The user can access the logical storage module by logging into a blockchain website and/or by downloading a mobile application that then provides access to the user's logical storage module (which may be the same application used to enable the user to perform authentication/verification at an event venue). A logical storage module interface may be configured to access and display the current UDEs of the user, the current logical storage module balance for crypto-assets, and/or the user's most recent UDE and other crypto-asset transactions.

When a user wishes to trade UDEs, buy UDEs, or sell UDEs related to events at venues (or otherwise), the user may send a corresponding communication to another user. The request can identify the UDE being offered and/or being requested, and in the case of a sale or purchase, specify the corresponding currency (e.g., cryptocurrency) amount. Optionally, a transaction fee may be charged by the system for each transaction. Optionally, in order to access the logical storage module, two factor authentication may be used to ensure that only the user can access the user's logical storage module, even if someone knows the user's logical storage module/account password. For example, when the user wants to access the logical storage module using a new device for the first time, the user may need to provide at least two pieces of information, the logical storage module password and a-verification code that's automatically displayed on a trusted user device or transmitted to the user's phone number.

Optionally, a UDE may be provided to the user during the event (after the user entered the venue for the event) in response to a specified event occurrence or series of occurrences. For example, if an event is an athletic event, a token may be provided in response to a certain score being reached or in response to a certain type and/or number of scoring occurrences (e.g., a 3 point play in basketball, a penalty score in hockey, a touchdown in football). By way of illustration, a UDE may be provided if either team in a football game scores three touchdowns. By way of further example, a user may be able to select one of the two teams in a football game, and if that user's selected team wins, the user may be provided a UDE (e.g., where the UDE may be associated with the winning team, such as representing a team logo, a photograph of one or more of the team players, an artwork depicting the team logo and/or team members, etc.). If the user device has network access, the user may be able to view the UDE in the user's synchronized distributed database logical storage module. In accordance with permission rules, the user may be enabled to exchange, transfer, sell, and/or purchase UDEs.

Optionally, a user may initially be granted anon-unique digital element, and in accordance with a given rule, if a certain event occurrence is detected, the system may convert/replace the non-unique digital element to a non-fungible token (sometimes referred to herein as a unique digital element) representing certain content. The UDE may, at times, be much more valuable than the original non-unique digital element, given its rarity.

Optionally, the UDE is transferred to a user synchronized distributed database logical storage module (sometimes referred to herein as a synchronized distributed database logical storage module) at least partly in response to the user being authenticated and having the user's event access rights verified at the venue, as described above. The UDE may be provided at no cost or for a fee. Optionally, in addition to a UDE, a user may be granted a fungible token (NDE) that may be used to acquire a real world object (e.g., a food items, a discount to an event access token, etc.). Optionally, a UDE and/or non-unique digital element granted to a user may be used to acquire points for a third party product or service (e.g., loyalty points for an airline, hotel, retailer, etc.). Optionally, the UDE provided to the user may be selected by the system using a rules engine. The rules engine may select the UDE based on one or more of the following criteria:
　the event,
　the venue,
　the user's seating location (e.g., seating section),
　the time at which the user was authenticated and verified,
　the user's arrival position (e.g., first to arrive, 100th to arrive, 10,050th to arrive, etc.),
　membership in a fan club associated with a performer at the event,
　membership in a loyalty club associated with the access control system,
　sponsorship of UDE by third party (e.g., an advertiser),
　a randomizer function (e.g., where only 10 users in an event venue or event venue seating section are to be provided UDEs, and they are selected randomly using the randomizer function).

Further, different rights may be associated with different UDEs. For example, certain UDEs may be associated with the right to sell the UDE. Certain UDEs may be associated with the right to exchange the UDE for other UDEs provided to other attendees at the event (but not the right to sell the UDE or to exchange the UDE for other UDEs that were not provided to an attendee at the event). Yet other UDEs may be associated with the right to exchange the UDE for other UDEs provided to other attendees at the event, but only during the event and optionally a certain threshold time period after the event, such as 4 hours or one day (but not the right to sell the UDE or to exchange the UDE for other UDEs that were not provided to an attendee at the event, and not the right to exchange the UDE after the event and threshold time period for other UDEs that were provided to an attendee at the event). Still other UDEs may be associated with the right to transfer the UDE and/or sell the UDE to certain subsets of other attendees at the event and not other event attendees or non-attendees. For example, an attendee may be enabled to exchange UDEs with other attendees within the user's seating section, but not with other attendees. Thus, for example, the following rights may or may not be granted:
　unrestricted right to sell, exchange, and/or otherwise transfer UDE,
　right to exchange or transfer the UDE to a specified set of users (e.g., other attendees at the event, members of the performers fan club, members of a loyalty club associated with the operator of the access control system, etc.),
　right to exchange for UDEs in a specified set of UDEs without a specified time limitation (e.g., UDEs provided only to event attendees, UDEs provided only to event attendees in the user's seating section, UDEs provided via the access control system operator, UDEs provided to attendees at other of the performer's events, UDEs provided by the access token seller, etc.) to sell, exchange, and/or otherwise transfer,
　right to exchange for UDEs in a specified set of UDEs with a specified time limitation (e.g., during the event, during the event and/or for a threshold period after the event, a specified time period after the event but not during the event, etc.).

Optionally, the synchronized distributed database logical storage module may be specifically associated with the issuer or distributor of the UDEs (e.g., the access control system operator), and the UDEs may only be sold, exchanged, or transferred using a UDE marketplace provided by the issuer or distributor. Optionally, any synchronized distributed database logical storage module compatible with UDE and blockchain standards may be utilized.

Optionally, the application that enables the user to access an event at a venue (e.g., without a physical access token and/or without an electronic access token for the event stored on the user device) may also include a synchronized distributed database logical storage module (such as described elsewhere herein) or logical storage module interface that enables the user to view the UDEs of the user (and optionally cryptocurrency or other synchronized distributed database elements), be notified of newly received UDEs, exchange UDEs for other UDEs, sell UDEs, otherwise transfer UDEs, review the user's UDE history (e.g., UDEs received in association with a ticketed event, purchased UDEs, UDEs exchanged out, UDEs exchanged in, UDEs gifted, UDEs sold, etc.) and associated dates/times, and prices of sold or purchased UDEs (if any)), and/or view current prices of UDEs (which may be specified in one or more cryptocurrencies and/or one or more government issued currencies).

Certain aspects will now be described with reference to the figures.

FIG. 1A illustrates an example networked environment that may be utilized to practice the example processes herein. An event access and multifactor authentication system 102 may communicate via a network 100 (e.g., the Internet, an intranet, a cellular network, and/or other network) with one or more venue systems 104, 106, 108 which may be located at (or may have components located at) one or more respective venues.

For example, a given venue system many have a corresponding authentication scanner located at a venue entrance (which may be an entrance to a venue building or may be an entrance with a building to a restricted area). A given authentication scanner may include, by way of example, one or more of: a camera configured to capture an image of a user and/or barcode (e.g., a 1D or 2D barcode, such as a QR code) for authentication purposes, a barcode scanner (e.g., a laser barcode scanner configured to scan barcodes), a radio frequency receiver configured to receive a wireless transmission comprising authentication data from user devices, a microphone configured to receive an audible signal comprising authentication data from a user device (e.g., user devices 110, 112, 114), a biometric reader (e.g., a fingerprint reader, an iris reader), and/or other device for receiving the unique user device and/or user identifier. A given venue system may include a network interface configured to communicate with the multifactor authentication system 102 and optionally other systems via the network 100.

The event access and multifactor authentication system 102 may be configured to store and provide access to two dimensional and/or three dimensional venue seating charts and event information. For example, the event information may include, for a given event, an event date, an event name (e.g., a name of a performer, a name of a tour, names of teams at a sporting event), an event venue, access token prices for event venue seats/sections, an indication as to which seat access tokens have been sold and which are available. The event access and multifactor authentication system 102 may store user account information including some or all of the following: a user name, a user email address, a user phone number/SMS/text messaging address, a user avatar (which may be selected by a user among content associated with the user's UDEs), geographical information (e.g., physical address, zip code, city, etc.) a unique user identifier (e.g., an alphanumeric identifier, fingerprint data, face print data, iris print data, and/or the like), a unique user device identifier, event identifiers corresponding to events the user has access rights to, user preferences (e.g., favorite performers, favorite venues, favorite musical styles, etc.), UDEs transferred to the user (including an identifier that enables the UDE to be located on a synchronized distributed database), UDEs re-transferred by the user to another person, fees paid for UDEs, unique UDE/cryptocurrency e-wallet identifier, and/or other user-related data disclosed herein.

The event access and multifactor authentication system 102 may be configured to authenticate a user using authentication data scanned by a venue authentication scanner as similarly discussed elsewhere herein. For example, the event access and multifactor authentication system 102 may use multifactor authentication in authenticating a user.

The event access and multifactor authentication system 102 may also be configured to: implement UDE allocation rules; rules that control a user's rights to sell, exchange, or otherwise transfer UDEs; and/or rules that control the conversion of anon-unique digital element to a unique digital element. For example, the event access and multifactor authentication system 102 may be configured to implement the rules and allocation processes described elsewhere herein.

The event access and multifactor authentication system 102 may be configured to record UDEs on a distributed ledger 116 (e.g., a blockchain or other synchronized distributed database). The synchronized distributed database 116 may be a public or private synchronized distributed database. As discussed elsewhere herein, a UDE may represent an image (e.g., a photograph, a video, a graphic, digital artwork, etc.), a sound file, and/or text. The UDE may be utilized to establish a verified and public proof of ownership of whatever rights were provided to the user to the content represented by the UDE (e.g., a license to use, copy, display the underlying content asset; the right to transfer sell, transfer, or exchange the UDE, etc.).

Figure 1B:
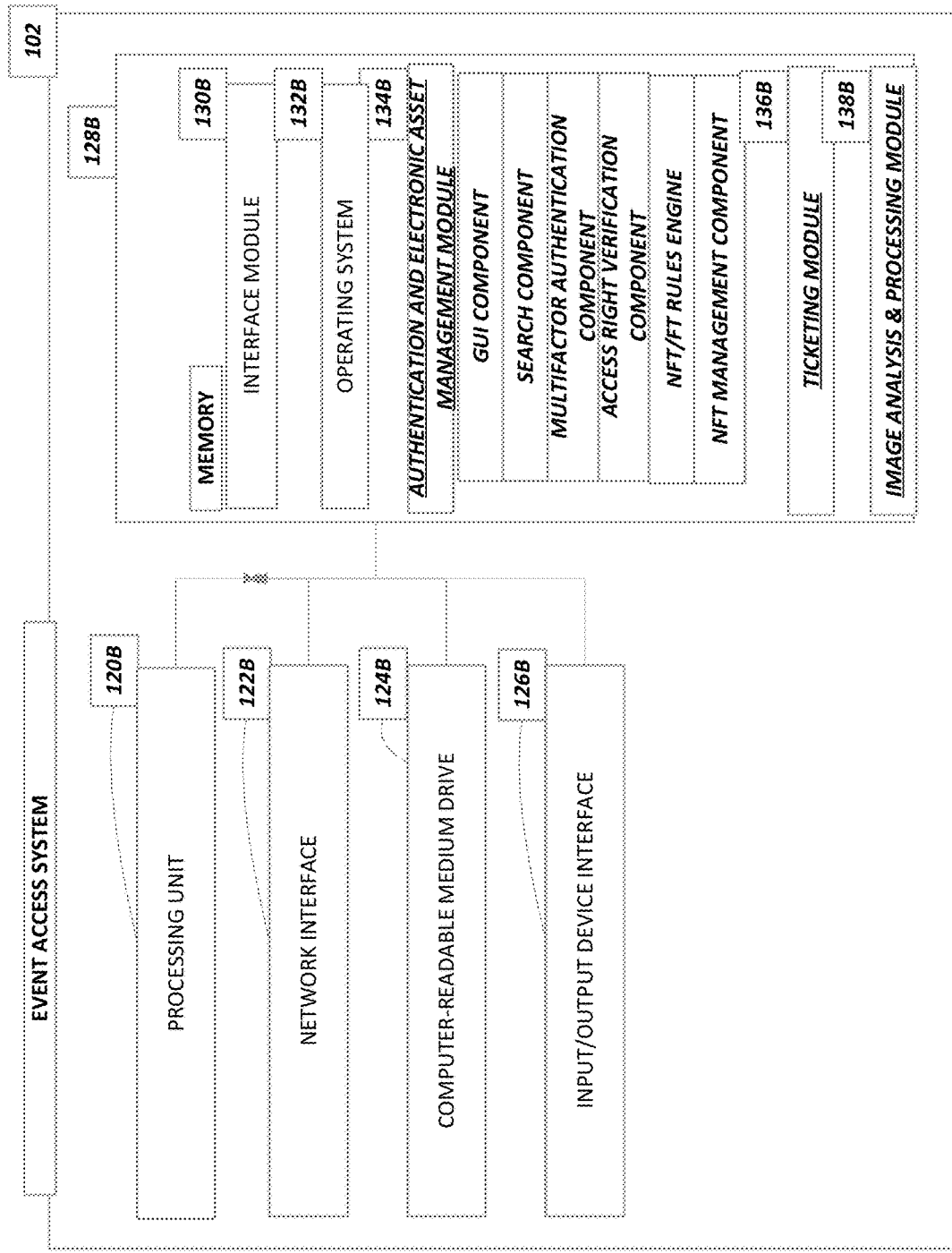
FIG. 1B illustrates an example system architecture.

FIG. 1B is a block diagram illustrating example components of the event access and multifactor authentication system 102. The example event access and multifactor authentication system 102 includes an arrangement of computer hardware and software components that may be used to implement aspects of the present disclosure. Those skilled in the art will appreciate that the example components may include more (or fewer) components than those depicted in FIG. 1B. The event access and multifactor authentication system 102 may comprise a cloud-based computer system.

With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The event access and multifactor authentication system 102 may include one or more processing units 120B (e.g., a general purpose process and/or a high speed graphics processor), one or more network interfaces 122B, a non-transitory computer-readable medium drive 124B, and an input/output device interface 126B, all of which may communicate with one another by way of one or more communication buses. The network interface 124B may provide services described herein with connectivity to one or more networks or computing systems (e.g., venue systems, user device, distributed ledgers, event promoters, seating chart visualization systems, etc.). The processing unit 120B may thus receive information (e.g., access token purchases, verification/authentication data, verification/authentication requests, etc.) and instructions from other computing devices, systems, or services via a network, and may provide responsive data and/or execute instructions. The processing unit 120B may also communicate to and from memory 12B4 and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of a authentication and electronic asset management module 134B, including its components.

The memory 128B may store user accounts, including a user name, a user email address, a user phone number/SMS/text messaging address, geographical information (e.g., physical address, zip code, city, etc.) a unique user identifier (e.g., an alphanumeric identifier, fingerprint data, face print data, iris print data, and/or the like), a unique user device identifier, event identifiers corresponding to events the user has access rights to, hashes of user device and/or user identifiers, user preferences (e.g., favorite performers, favorite venues, favorite musical styles, other preferences discussed herein, and/or the like), payment instrument data, and/or other user data described herein. The memory 128B may store may also store event, access token, and venue information, such as discussed elsewhere herein.

Some or all of the data and content discussed herein may optionally be stored in a relational database, an SQL database, a NOSQL database, or other database type. Because the content elements may include BLOBs (binary large objects), such as large images (e.g., still photographs, videos, multilayered graphics) which may be difficult for conventional database to handle, some (e.g., BLOBs) or all of the content elements may be stored in files and corresponding references may be stored in the database. Optionally, the memory 128B may include one or more third party cloud-based storage systems.

The authentication and electronic asset management module 134B may include a GUI component that generates graphical user interfaces and processes user inputs and a search component (which may include a search engine used to search for ticketed events). The authentication and electronic asset management module 134B may also include a multifactor authentication component configured to authenticate users. As discussed above, the authentication may be performed by comparing a hash of a unique user identifier and a unique device identifier with that generated by the event access system 102. By way of further example, the authentication may be performed by decrypting data (e.g., using a private key or the key used to perform encryption) comprising a unique user identifier and a unique device identifier, and comparing the decrypted data with that stored by the event access system 102. As similarly discussed elsewhere herein, optionally Advanced Encryption Standard (AES), a symmetric encryption algorithm that encrypts fixed blocks of data (of 128 bits) at a time, may be used. By way of further example, optionally Rivest-Shamir-Adleman (RSA) encryption/decryption techniques may be utilized. By way of yet further example, optionally triple DES (Data Encryption Standard) encryption/decryption techniques may be utilized. By way of yet further example, a hash function may be utilized. Optionally, in addition or instead, authentication may be performed using biometric readings of a user.

An access right verification component may be configured to determine whether an authenticated user has an associated right to access an event at a venue (and/or a portion of an event venue), a UDE/NDE rules engine (e.g., configured to determine whether a UDE and/or non-unique digital element (sometimes referred to as an NDE or FT) are to be granted to a user, which UDEs and/or non-unique digital elements are to be granted to the user, whether anon-unique digital element granted to a user is to be converted to a unique digital element, and/or the like), and a UDE management component which may be configured to grant UDEs in accordance with the determinations of the rules engine, track transfers of UDEs by users, charge transaction fees associated with UDE transfers, manage electronic logical storage modules, cause UDE grant, transfer, conversion notifications to be provided to users via user devices, and/or the like.

A ticketing module 136B may be configured to enable users to view information regarding ticketed events, access event venue seating charts, view available and unavailable event venue seats, access images of a view from a given seat, view access token prices, create a user account (optionally including some or all of the user account information discussed herein), purchase or otherwise obtain one or more access rights (e.g., access tokens) to the event, store an indication of access rights obtained by the user, and/or recommend events to the user (e.g., using the user's preferences, access token acquisition history, geographical location, event sponsorship, and/or the like).

An image analysis and processing module 138B may be configured to perform image analysis (e.g., on optical indicia encoding encrypted authentication data), perform contrast enhancement, deblurring, and/or image rotation to thereby enhance the decoding and decryption of images of optical indicia (e.g., barcodes captured using a camera device).

Optionally, during an event, a seating chart of all or a portion of the event venue may be provided to user devices indicating by seat position, which user has which UDE (where the names or real names of users are not optionally not provided to ensure privacy). The seating chart may be updated in real time to reflect new transfers of UDEs to users (e.g., upon a user's arrival at the event venue being verified, upon a certain scoring event, etc.), transfers of UDEs between users, and/or conversions of non-unique digital elements to UDEs. A user interface (e.g., a logical storage module or other user interface) may be provided via the application hosted on a given user device where a user can indicate whether or not the user is willing to trade or sell the user's UDE.

By way of illustration, the seating chart may be configured to detect a user pointing at a given seat or set of sets on the seating chart (e.g., by touching a seating area on a touch screen display, by hovering a cursor over a seating area, by clicking on a seat or seating area, and/or the like). In response, the seating chart may be updated by the system 102 to display the content or representation represented by the corresponding UDE held the user(s) at the pointed at seat or set of seats, and may present an indication (e.g., a graphic, text, or color indication) as to whether a given user is or is not willing to trade or sell their UDE.

If the content is playable (e.g., a video and/or audio file), optionally, the seating chart will play the content automatically or in response to a user interaction with the content (e.g., by pointing at the content or an associated control).

Optionally, an avatar or other image corresponding to a user and/or an alias for the user may also be displayed over the corresponding seat. The seating chart user interface may enable a user to select a given UDE associated with a given user at a given seat and provide an exchange or purchase offer (including a purchase amount) to the user associated with the given seat. The system 102 may receive and enable the exchange or purchase offer to be transmitted to the application on the given user's device for presentation to the user. The presentation may include a representation of the content associated with the UDE of the requesting user (in the case of an offer for exchange) or the purchase amount (in If the case of an offer to purchase). If the exchange or purchase request is accepted by the user associated with the given seat, the system 102 may enable the corresponding exchange or transfer of UDEs to be recorded on the distributed ledger and hence to be reflected in the users digital logical storage modules.

If the user is only permitted to exchange UDEs with certain other users that meet certain rule-based criteria (e.g., have seats in the user's section or other designated seating areas whose occupants the user has permissions to exchange UDEs with), the seating chart may be coded (e.g., using color, text, icons, and/or the like) to indicate which occupants in which seating areas the user has permission to trade UDEs with. Optionally, the system 102 inhibits the presentation via the seating chart of content associated UDEs of occupants in seating areas that the system 102 determines the user does not have permission to trade UDEs with.

The memory 128B may include an interface module 130B. The interface module 130B can be configured to facilitate generating one or more interfaces through which a compatible computing device may send to, or receive from, the authentication and electronic asset management module 134B and ticketing module 136B, data and content.

Figure 2:
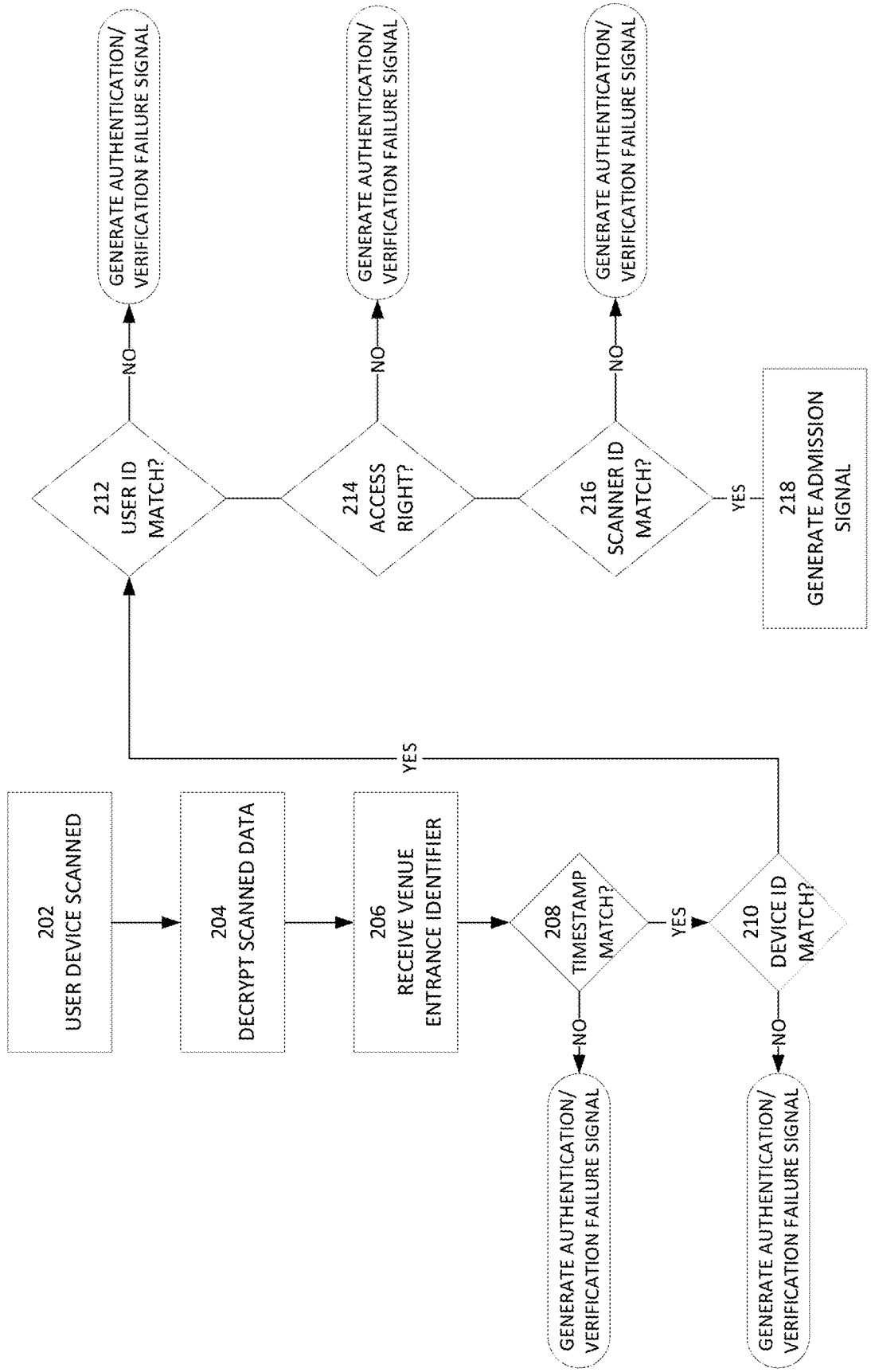
FIGS. 2 and 3 illustrate example processes.

Referring now to FIG. 2, an example authentication/verification process is illustrated. The process may be executed using an event access and multifactor authentication system, a venue system, and/or other system, such as described elsewhere herein. Although the following example discusses encryption of authentication data by and presented on a user device, optionally the authentication data is not encrypted. Optionally, the user device presents the authentication data in unencrypted form (e.g., via a barcode), and the authentication data is read by a scanner which encrypts the authentication (e.g., using key encryption or a hash). Optionally, the encryption may be performed by other systems described herein.

At block 202, a user device is scanned by a venue authentication scanner to access encrypted authentication data. As discussed above, the user device may present a unique user identifier and/or a unique device identifier via an encrypted optical code, via an encrypted radiofrequency signal, and/or via an encrypted audio signal. Thus, for example, the scanner may comprise a camera, laser scanner, a radiofrequency receiver, or a microphone.

The scanned authentication data may be compressed. For example, if a camera is used to capture an image of the authentication data, the image may be compressed to reduce the file image size, thereby reducing the memory needed to store the image and the network bandwidth needed to transmit the image. The compression may be lossless or lossy. By way of example, if lossy compression is used, transform coding (e.g., a Discrete Cosine Transform (DCT)) may be used to perform the compression. If lossless compression is used, run length encoding, entropy encoding, predictive coding. The image may optionally be decompressed using a decompression module corresponding to the form of encryption.

Optionally a timestamp generated by an application hosted on the user device is received as well, where the timestamp may or may not be encrypted. The encryption may optionally be performed using a key built into the application (e.g., a public key of the event access and multifactor authentication system or other system performing the decryption). Optionally, a hash may be applied to the authentication data (e.g., the unique user ID and/or the unique device ID). Optionally, in addition to or instead, a biometric scanner may take a reading of a biometric feature of the user (e.g., a face print, a fingerprint, an iris image, etc.).

At block 204, the encrypted authentication data is decrypted (e.g., using a decryption key, such as a private key associated with the system performing the decryption). Optionally, if the authentication data received is hashed authentication data, the decryption operation is not performed. In addition, the system may generate its own timestamp. Optionally, the encrypted authentication data may be transmitted to a system, remote from the venue authentication scanner, that performs the decryption.

Optionally, image analysis and processing are performed on an image of the optical indica to enhance its readability and hence the accuracy in decoding and decryption. For example, if the optical indicia (e.g., a QR code or other barcode) is black and displayed against a dark background or over an image on the user device, contrast enhancement may be performed in response to detecting insufficient contrast (e.g., by failing to detect clear edges). For example, a filter may be utilized that identifies edge boundaries in the image of the optical indication, such as the edge between a barcode and a background of a contrasting color, and that increases the image contrast in the area immediately adjoining the detected edge.

In addition, if the optical code is blurry it may be difficult to accurately decode and decrypt the optical code. Therefore, a deblurring and/or noise reduction process may be performed. The deblurring process may include the application of a convolutional filter to the image of the optical code. Deblurring and noise reduction may be performed using a deep learning convolutional neural network. The convolutional neural network may optionally include a neural network input layer, one or more neural network hidden layers, a neural network pooling layer, and a neural network output layer. Other learning engines may be used. Convolutional neural networks may also be utilized to perform mage classification, recognition, localization, and/or object detection. Optionally, an autoencoder may be utilized to convert a low resolution image to a higher resolution image.

Optionally, the optical indicia image may be rotated to alight with a desired orientation to further facilitate the decoding and decryption of the encoded authentication data.

A block 206, a venue entrance identifier is received. The venue entrance identifier may correspond to the venue entrance where the authentication scanner is positioned and may be received from the authentication scanner specifically or from the venue system. The venue identifier may be an alphanumeric code and may include descriptive metadata (e.g., entrance 1 on east side of venue).

At block 208, a determination is made as to whether the timestamp received from the user device matches the system generated timestamp. If a determination is made that the timestamps fail to match (e.g., exactly match or match within a certain range of time, such as 1-15 seconds), an authentication/verification failure signal may be generated. The signal may be used to cause the illumination of a light of a certain color (e.g., red), the presentation of text (e.g., "authentication failed") on a display, the presentation of a graphic (e.g., a prohibition symbol) on a display, and/or a generation of a sound (e.g., a boing sound) via a speaker.

If a determination is made that the timestamps match, the process may proceed to block 210. A determination may be made as to whether the device ID value received from the user device matches a unique device ID (e.g., an IMEI, a UDID, a serial number, an IDFA, and/or a GAID) in a user account record. If a determination is made that the received device ID fails to match an authentication/verification failure signal may be generated. The signal may be used to cause the illumination of a light of a certain color (e.g., red), the presentation of text (e.g., "authentication failed") on a display, the presentation of a graphic (e.g., a prohibition symbol) on a display, and/or a generation of a sound (e.g., a boing sound) via a speaker.

If a determination is made that the device IDs match, the process proceeds to block 212. A determination is made as to whether the user ID matches value received from the user device matches a unique user ID in the user account record that stores the matching unique device ID. If a determination is made that the received user ID fails to match, an authentication/verification failure signal may be generated as similarly discussed above.

If a determination is made that the user IDs match, the process proceeds to block 214. At block 214, using the user ID and/or device ID a determination is made via the user account record as to whether the user has an access right to the event at the venue on the current day.

If a determination is made that the user has an access right to the event at the venue on the current day, optionally, at block 216 a determination may be made as to whether the venue authentication scanner ID corresponds to a venue entrance that the user is entitled to access (e.g., by comparing a seat assigned to the user from the user account with a list of entrances corresponding to access to the assigned seat). If a determination is made that the venue authentication scanner ID does not correspond to a venue entrance that the user is entitled to access an authentication/verification failure signal may be generated as similarly discussed above. Optionally, a notification comprising text may be presented indicating what venue entrance(s) the user is entitled to access. The user may then proceed to such a permitted entrance and repeat the scanning a verification process.

If a determination is made that the venue authentication scanner ID corresponds to a venue entrance that the user is entitled to access, at block 218, an admission signal may be generated. The admission signal may cause the illumination of a light of a certain color (e.g., green), text (e.g., "authentication approved"), a graphic (e.g., a thumbs-up symbol), and/or a sound (e.g., a bell sound). Optionally, the number of access rights that the user has is presented. Optionally, the admission signal may cause an entrance barrier to be unlocked or opened to enable the user to access the entrance. For example, the signal may activate a solenoid, stepper motor, and/or pneumatic actuator to enable the unlocking and/or opening of an entrance door, the withdrawal of a barrier, the unlocking and/or rotation of a turnstile, and/or the like. In addition, the admission signal may be utilized in determining whether an electronic element, such as a UDE, is to be allocated to the user as similarly discussed with respect to FIG. 3 and elsewhere herein.

Optionally, rather than comparing user IDs and device IDs, a hash of a User ID and/or device ID received from the user device (e.g., via a radiofrequency signal, an optical indicia, an audio signal) may be compared to a hash of a user ID and/or device ID from a user account to determine if there is a match. If there is a match and if there is a timestamp match, the process may proceed to block 212. Otherwise, an authentication/verification failure signal may be generated as similarly discussed above.

Figure 3:
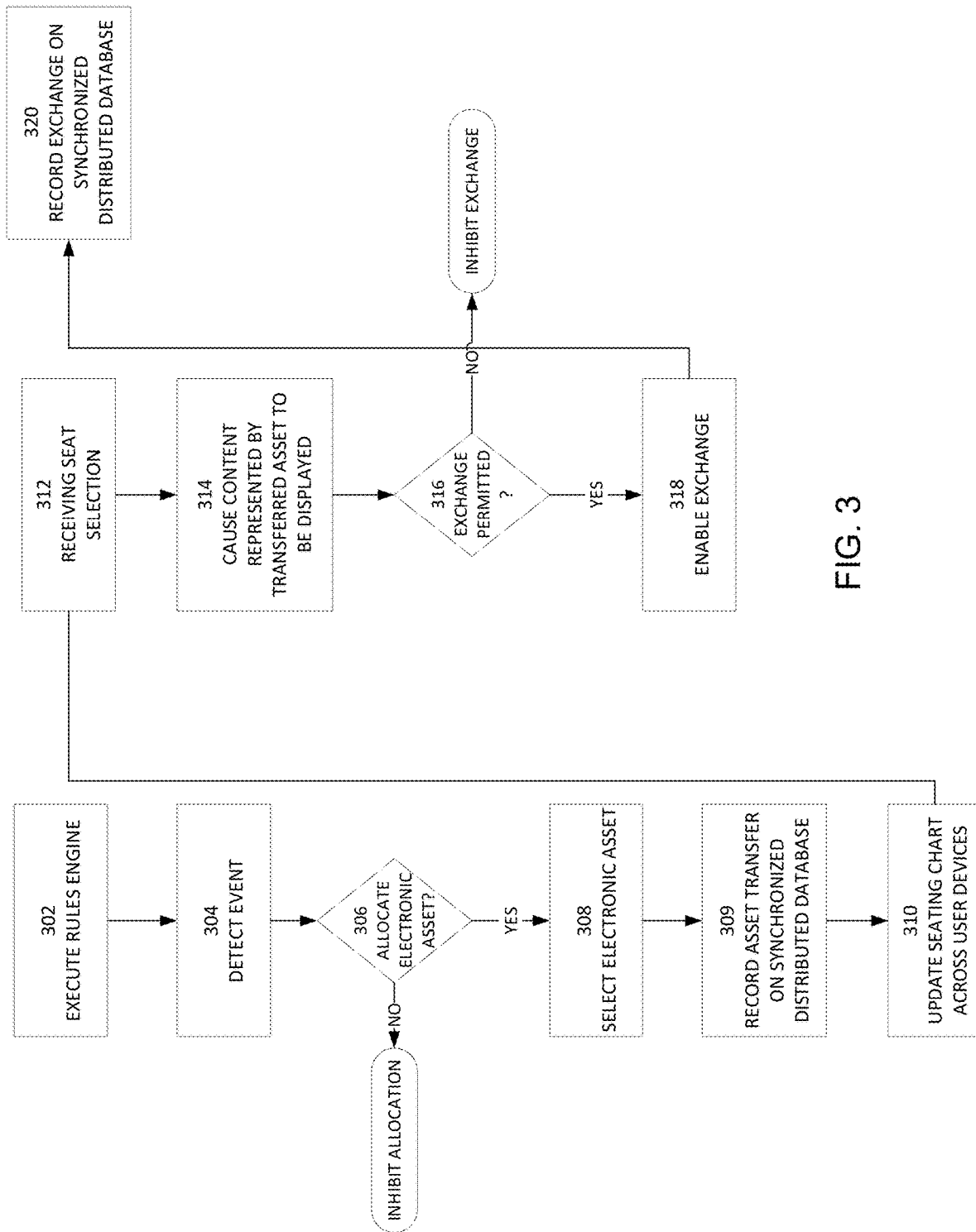

Now referring to FIG. 3, an example electronic element management process will be described. By way of example, the electronic element may be a UDE and/or anon-unique digital element. At block 302, a rules engine, such as the UDE/NDE rules engine discussed above with respect to FIG. 2, is executed (e.g., by the system 102). The rules engine may be configured to detect certain events (e.g., via cameras, microphones, digital data monitoring, user inputs, and/or the like) that may trigger the distribution and/or conversion of electronic elements, such as tokens. For example, the rules engine may be configured to generate a command to allocate an electronic element (e.g., a UDE or NDE) to a user attending an event at a venue in response to one or more of the following example events:

- detecting authentication/verification/admission of the user at a venue entrance
- detecting a scoring event, where the venue event is a sporting event detecting a win at a sporting event
- detecting playing of a song at a concert
- detecting (e.g., using a microphone) a volume level being achieved at the event (e.g., where attendees' cheering and/or applause reach a threshold volume letter, optionally for a threshold period of time)
- detecting the end of the event (e.g., based on a calendared time, based on detection of light above a certain brightness using a light sensor, etc.)
- detecting the user leaving the event venue (e.g., via a venue scanner scanning the user device at an exit)
- detecting a certain date and/or time being reached In addition, the rules engine may determine which electronic element is to be distributed in response to which event, to which user. For example, certain users may (e.g., based on their seat location) be allocated UDEs for lower number editions of a given content item (e.g., photograph, graphic, painting, etc.) than other users at less expensive seating locations. By way of additional example, different UDEs may be allocated to different seating sections. By way of further example, certain users that have indicated in their profile that they are a fan of a first team in a sporting event, may be given UDEs corresponding to images of the first team or first team members, while certain users that have indicated in their profile that they are a fan of a second team in a sporting event, may be given UDEs corresponding to images of the second team or second team members. By way of yet further example, users that arrive earlier at an event than other users may be given a UDE corresponding to a lower edition item of content.

At block 304, an event is detected (e.g., an event described herein and/or other event). For example, the event may be detected via cameras, microphones, light sensors, digital data monitoring, user inputs, and/or the like. At block 306, a determination is made as to whether the rules engine indicates that the event is to trigger an allocation of an electronic element. If a determination is made that the rules engine indicates that the event does not trigger an allocation of an electronic element, allocation of electronic elements is inhibited.

If a determination is made that the rules engine indicates that the event does trigger an allocation of an electronic element, at block 308, the electronic element is selected based on one or more rules and optionally user characteristics as similarly described elsewhere herein.

At block 309, the selected electronic element is transferred to the user by recording the electronic element (e.g., a UDE and/or an NDE) on a synchronized distributed database (e.g., a distributed ledger).

At block 310, electronic seating charts displayed or displayable on one or more user devices (e.g., user devices at the event venue or in a specific seating area or areas at the event venue) via an application hosted on the user devices (e.g., an application configured to provide authentication data as described elsewhere herein, that enables a user to purchase access tokens, that provides access to a user's access token acquisition history, that provides access to a token logical storage module, that enables users to exchange/transfer/sell tokens, and perform other related functions described herein) may be updated, optionally in real time, to indicate the transfer of the electronic element (representing a content item) to the user. For example, a thumbnail image of the content item, an avatar corresponding to the user, and/or a seat identifier (e.g., seating section, row, seat number) may be displayed overlaying the seat in the seating chart displayed on user devices.

At block 312, a given user selection of a seat in the updated seating chart may be received via application hosted on the given user's device. For example, the selection may be received by a user pointing at the seat symbol (e.g., touching the seat symbol if the user's device has a touch screen, clicking the seat symbol via a button activation, hovering over the seat symbol with a cursor, etc.). At block 314, the content item may be displayed in a larger format (e.g., full screen, half screen, quarter screen, or other size) on the user device display in response to such selection. A control may be provided via the application which the given user can use to offer to exchange an electronic element held by the given user for the electronic element corresponding to the displayed content item (or to purchase the displayed content item).

In response to receiving an exchange (or purchase) request, at block 316, a determination is made as whether the request exchange (or transfer) for the electronic elements involved is permitted based on associated transfer rules. If a determination is made that such exchange (or sale) is prohibited, the exchange (or sale) is inhibited, and a corresponding transfer prohibited notification may be provided to the users involved via the application hosted on the user device. As discussed above, certain rules may be implemented to control the transfer of electronic elements, such as one or more of the following:

- permit unrestricted right to sell, exchange, and/or otherwise transfer the electronic element (e.g., a UDE),
- permit the exchange or transfer of the electronic element to a specified set of users (e.g., other attendees at the event, members of the performers fan club, members of a loyalty club associated with the operator of the access control system, etc.),
- permit the exchange of the electronic element for electronic elements in a specified set of electronic elements without a specified time limitation (e.g., electronic elements provided only to event attendees, electronic elements provided only to event attendees in the user's seating section, electronic elements provided via the access control system operator, electronic elements provided to attendees at other of the performer's events, electronic elements provided by the access token seller, etc.) to sell, exchange, and/or otherwise transfer,
- permit the exchange of the electronic element for electronic elements in a specified set of electronic elements with a specified time limitation (e.g., during the event, during the event and/or for a threshold period after the event, a specified time period after the event but not during the event, etc.).

If a determination is made that such exchange (or sale) is permitted, at block 318, the exchange (or sale) of the electronic element is enabled. At block 320, the exchange (or sale) is recorded on the synchronized distributed database.

Figure 4A:
FIGS. 4A-4B illustrate example user interface.
Figure 4A:
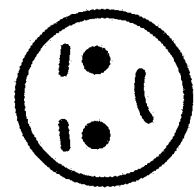
Figure 4A:
Figure 4A:
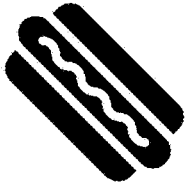
Figure 4A:
Figure 4A:
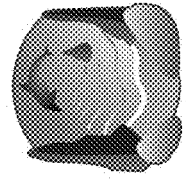
Figure 4B:
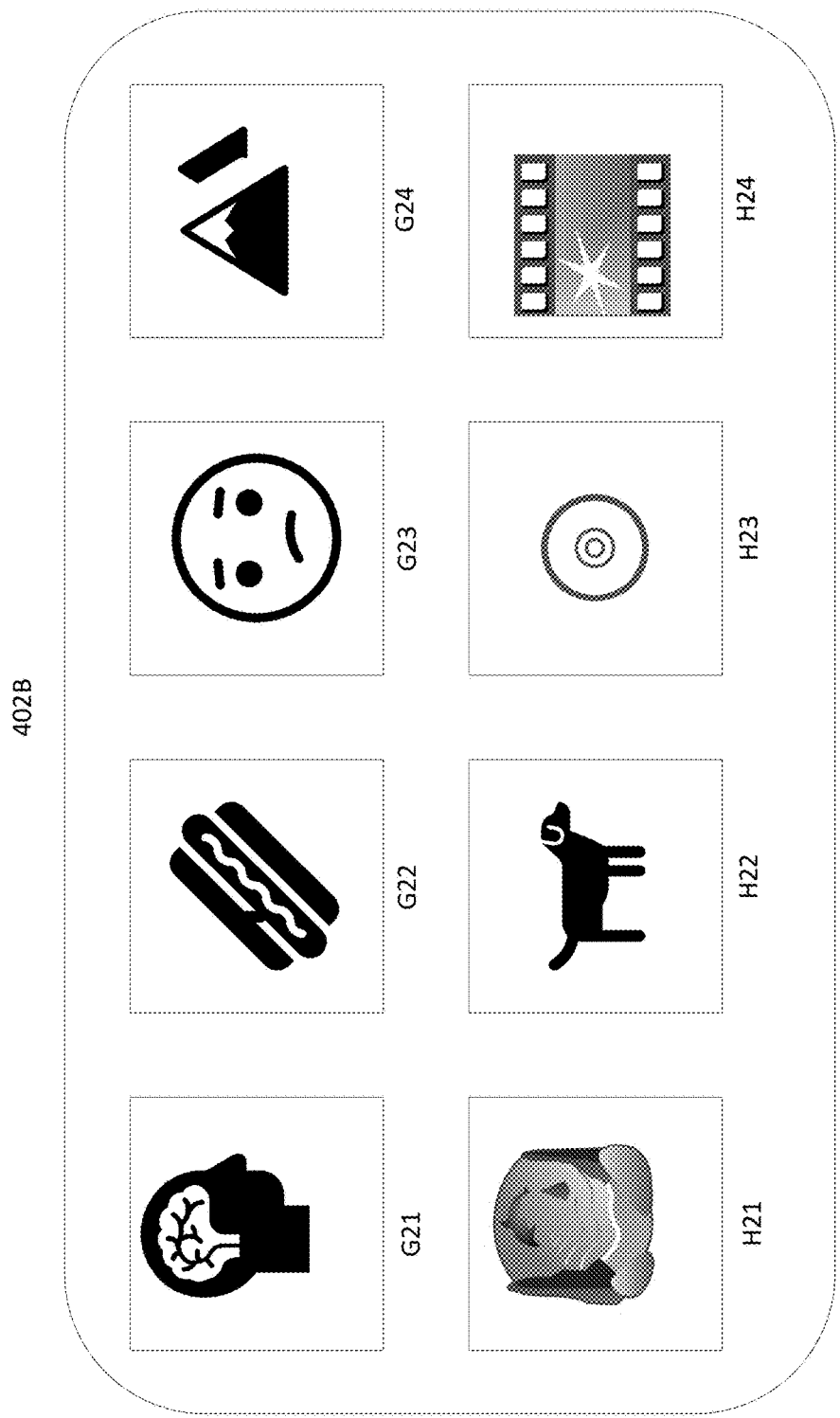

FIG. 4A illustrates an example seating chart. Each square is a symbol corresponding to a venue seat. Content items associated with electronic elements (e.g., UDEs) are displayed as thumbnails overlaying the seat symbol. In addition, the seat identifier (e.g., seat row and number) is positioned overlaying or adjacent to the seat symbol. In this example, if the user seating in seat G22 requests to exchange the UDE representing a dog for the UDE representing a hotdog held by the user sitting in seat H22. If the exchange request is approved, then the seating chart may be updated as illustrated in FIG. 4B, with the hotdog image overlaying the seat symbol for seat G22, and the dog image overlaying the seat symbol for seat H22.

Thus, systems and methods are disclosed configured to securely distribute and exchange content using multi-credentialed authentication (e.g., multifactor authentication comprising multi-credential and geographical location verification).

Optionally, as discussed herein, an image of optical indicia that contains encoded and encrypted authentication data may be processed and analyzed to extract the authentication data. For example, image decompression, image contrast (e.g., edge) enhancement, image deblurring, and/or image rotation may be performed. A neural network, comprising an input layer, and output layer, and one or more hidden layers may be utilized in performing image enhancement.

Thus, an aspect of the present disclosure relates to methods and systems for performing multifactor authentication. An authentication code may be encrypted in optical indicia. An image of the authentication code may be captured from a device having a display using a digital camera. The image may be in a compressed format and transmitted over a network to an image analysis system. The image analysis system may decode the optical indicia to obtain the encoded authentication data and may perform decryption on the decoded data. The image analysis system optionally performs image enhancement prior to performing decoding, including contrast enhancement, deblurring, and/or image rotation. Image enhancement may be performed using a neural network comprising an input layer an output layer and one or more hidden layers. The authentication data and location data associated with the digital camera may be utilized to authenticate the device.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer system, comprising:
a network interface;
a scanner comprising a camera and/or a laser;
at least one processing device;
non-transitory computer readable memory having program instructions stored thereon that when executed by the at least one processing device cause the system to perform operations comprising:
receive encrypted data obtained by the scanner, at a venue via a device of a first user;
decrypt using a decryption key, the encrypted data obtained via the scanner;
compare the decrypted data obtained by the scanner at the venue with data associated with user records to identify a matching user record;
determine whether the first user has an access right to access an event at the venue based at least in part on data in the matching user record;
at least partly in response to determining that the first user has an access right to access an event at the venue,
transmit an instruction to an authentication verification interface in physical proximity to the scanner to provide a corresponding visual indication to a person via a visual indicator;
after the first user has accessed the event at the venue, at least partly in response to detecting a first occurrence during the event, the first occurrence related to an event performance by one or more performers at the venue during the event and/or in response to determining that the first user has obtained access to the event at the venue, select a first electronic element comprising a fungible or non-fungible token comprising an image, the image separate from the data obtained by a scanner at a venue via the device of the first user and the image distinct from an entry ticket;
cause the first electronic element, selected at least partly in response to detecting the first occurrence during the event and/or in response to determining that the first user has obtained access to the event at the venue, to be transferred to the first user during the event, and recording the transfer of the first electronic element to the first user on a distributed synchronized database;
during the event, updating a seating user interface, including a representation of a seat of the first user, displayed on a device of a second user, with the fungible or non-fungible token image corresponding to the first electronic element;
enabling the second user to transmit, during the event, a request to the first user, the request comprising a request to transfer the first electronic element comprising the image, the image separate from the data obtained by a scanner at a venue via the device of the first user, associated with the fungible or non-fungible token to the second user;
at least partly in response to receiving from the first user an approval of the transfer of the first electronic element comprising the image, recording the transfer of the first electronic element to the second user on the distributed synchronized database.

2. The computer system as defined in claim 1, wherein the fungible or non-fungible token is minted in real time at least partly in response to detecting the first occurrence during the event, the first occurrence related to an event performance by one or more performers at the venue during the event and/or in response to determining that the first user has obtained access to the event at the venue.

3. The computer system as defined in claim 1, wherein the fungible or non-fungible token is a fungible token, wherein the fungible token is converted to a non-fungible token during the event in response to a second occurrence.

4. The computer system as defined in claim 1, wherein the fungible or non-fungible token is only transferable during the event to other attendees at the event.

5. The computer system as defined in claim 1, wherein the image comprises a unique artwork.

6. The computer system as defined in claim 1, wherein the system is configured to perform operations comprising:
during a second event at a second venue, after a second user has accessed the second event at the second venue, at least partly in response to detecting an occurrence during the second event and/or in response to determining that the second user has obtained access to the second event at the venue, provide a non-transferable second electronic element comprising a fungible or non-fungible token to the second user.

7. The computer system as defined in claim 1, wherein the fungible or non-fungible token is stored in a logical storage module of the device of the first user, wherein multifactor authentication is used to obtain access to the logical storage module.

8. The computer system as defined in claim 1, wherein the computer system is configured to use a geographical location of the first user to determine whether the first user has an access right to access an event at the venue.

9. The computer system as defined in claim 1, wherein the scanner comprises an imager.

10. The computer system as defined in claim 1, wherein the system is configured to perform operations comprising:
detecting that a second occurrence, related to a sports team score, has occurred in the venue during the event; and
at least partly in response to detecting that the first occurrence has occurred in the venue during the event, record during the event, on to the distributed synchronized database a transfer of a second electronic element.

11. The computer system as defined in claim 1, wherein the system is configured to perform operations comprising:
detecting that a second occurrence has occurred in the venue during the event;
at least partly in response to detecting that the first occurrence has occurred in the venue during the event, record on to the distributed synchronized database a transfer of a second electronic element to a third user; and
enabling a fourth user to exchange third electronic element for the second electronic element during the event.

12. The computer system as defined in claim 1, wherein the system is configured to perform operations comprising:

selecting the first electronic element for transfer, during the event, to the first user based at least in part on a seat location at the venue.

13. A computerized method, the method comprising:

receiving at a computer system comprising a processor device, encrypted data associated with a first user obtained by a scanner, comprising a camera and/or a laser, at a venue;

decrypting using a decryption key, the encrypted data obtained by the scanner;

using the decrypted data to identify a user record with corresponding data;

determining whether the first user has an access right to access an event at the venue based at least in part on data in the identified user record at least partly in response to determining that the first user has an access right to access an event at the venue, causing, using the computer system, an authentication verification interface in physical proximity to the scanner to provide a corresponding visual indication via a visual indicator;

after the first user has accessed the event at the venue, at least partly in response to detecting a first occurrence during the event, the first occurrence related to an event performance by one or more performers at the venue during the event and/or in response to determining that the first user has obtained access to the event at the venue, identifying a first electronic element comprising a fungible or non-fungible token comprising an image, the image separate from the data obtained by a scanner at a venue via a device of the first user and the image distinct from an entry ticket;

causing the first electronic element, identified at least partly in response to detecting the first occurrence during the event and/or in response to determining that the first user has obtained access to the event at the venue, to be transferred to the first user during the event, and recording a transfer of the first electronic element to the first user on a distributed synchronized database, wherein the first electronic element is only transferrable from the first user during the event to another user at the event;

enabling a second user to transmit, during the event, a request to the first user, the request comprising a request to transfer the first electronic element comprising the image, the image separate from the data obtained by a scanner at a venue via the device of the first user, associated with the fungible or non-fungible token to the second user; and at least partly in response to receiving from the first user an approval of a transfer of the first electronic element comprising the image and to determining that the second user is at the venue during the event, recording the transfer of the first electronic element to the second user on the distributed synchronized database.

14. The computerized method as defined in claim 13, wherein the fungible or non-fungible token is minted in real time at least partly in response to detecting the first occurrence during the event, the first occurrence related to an event performance by one or more performers at the venue during the event and/or in response to determining that the first user has obtained access to the event at the venue.

15. The computerized method as defined in claim 13, wherein the fungible or non-fungible token is a fungible token, wherein the fungible token is converted to a non-fungible token during the event in response to the first occurrence.

16. The computerized method as defined in claim 13, wherein the image comprises a unique artwork.

17. The computerized method as defined in claim 13, wherein the system is configured to perform operations comprising:

during a second event at a second venue, after a second user has accessed the second event at the second venue, at least partly in response to detecting an occurrence during the second event and/or in response to determining that the second user has obtained access to the second event at the venue, provide a non-transferable second electronic element comprising a fungible or non-fungible token to the second user.

18. The computerized method as defined in claim 13, wherein the fungible or non-fungible token is stored in a logical storage module of the device of the first user, wherein multifactor authentication is used to obtain access to the logical storage module.

19. The computerized method as defined in claim 13, the method further comprising using a geographical location of the first user to determine whether the first user has an access right to access an event at the venue.

20. The computerized method as defined in claim 13, wherein the scanner comprises a camera.

21. The computerized method as defined in claim 13, the method further comprising:

detecting that a second occurrence, related to a sports team score, has occurred in the venue during the event; and at least partly in response to detecting that the first occurrence has occurred in the venue during the event, recording during the event, on to the distributed synchronized database, a transfer of a second electronic element.

22. The computerized method as defined in claim 13, the method further comprising:

detecting that a second occurrence has occurred in the venue during the event;

at least partly in response to detecting that the first occurrence has occurred in the venue during the event, record on to the distributed synchronized database a transfer of a second electronic element to a third user; and enabling a fourth user to exchange third electronic element for the second electronic element during the event.

23. The computerized method as defined in claim 13, the method further comprising:

selecting the first electronic element for transfer to the first user based at least in part on a seat location at the venue.

* * * * *